United States Patent [19]
Fujinami et al.

[11] Patent Number: 5,102,108
[45] Date of Patent: Apr. 7, 1992

[54] VIBRATION-DAMPING DEVICE WITH HYDRAULIC DAMPING

[75] Inventors: Kyouichi Fujinami, Inazawa; Hiroaki Kawahara, Nagoya; Tetsuo Asano, Komaki; Takashi Maeno, Nishikasugai, all of Japan

[73] Assignee: Toyoda Gosei Co., Ltd., Nishikasugai, Japan

[21] Appl. No.: 664,060

[22] Filed: Mar. 5, 1991

[30] Foreign Application Priority Data

Mar. 6, 1990 [JP] Japan .................................. 2-54345
Oct. 30, 1990 [JP] Japan ................................. 2-293220

[51] Int. Cl.⁵ .............................................. B60G 15/06
[52] U.S. Cl. ............................... 267/219; 267/140.1 C
[58] Field of Search ............ 267/140.1, 219, 35; 248/562, 636

[56] References Cited

U.S. PATENT DOCUMENTS

| | | | |
|---|---|---|---|
| 4,790,520 | 12/1988 | Tanaka et al. | 267/219 X |
| 4,872,650 | 10/1989 | Tabata et al. | 267/140.1 |
| 4,998,345 | 3/1991 | Funahashi et al. | 267/140.1 X |
| 5,007,304 | 4/1991 | Ide | 267/140.1 X |

*Primary Examiner*—Robert J. Oberleitner
*Assistant Examiner*—Lee W. Young
*Attorney, Agent, or Firm*—Cushman, Darby & Cushman

[57] ABSTRACT

A vibration-damping device with hydraulic damping has a base body, a cylindrical holder secured to the base body, and an outer cylinder press-fitted within the cylindrical holder. A vibration-damping rubber body provided with a main liquid chamber enclosing a damping liquid is disposed within the outer cylinder, and retains an inner cylinder. A thin rubber wall is disposed between the outer cylinder and the vibration-damping rubber body, and defines an auxiliary liquid chamber with the vibration-damping rubber body. This auxiliary liquid chamber communicates with the main liquid chamber by way of a throttled passageway. The cylindrical holder has a rib-like projection which radially outwardly project therefrom, and extends in a circumferential direction thereof. This projection defines a groove along an inner surface of the cylindrical holder. This groove communicates with a space defined by the outer cylinder and the thin rubber wall by way of a through hole formed in the outer cylinder, whereby the thin rubber wall freely deforms due to the flow of the damping liquid from the main liquid chamber to the auxiliary liquid chamber, and accordingly, effective vibration-damping operation can be performed.

5 Claims, 4 Drawing Sheets

FIG.5
PRIOR ART
FIG.6
PRIOR ART
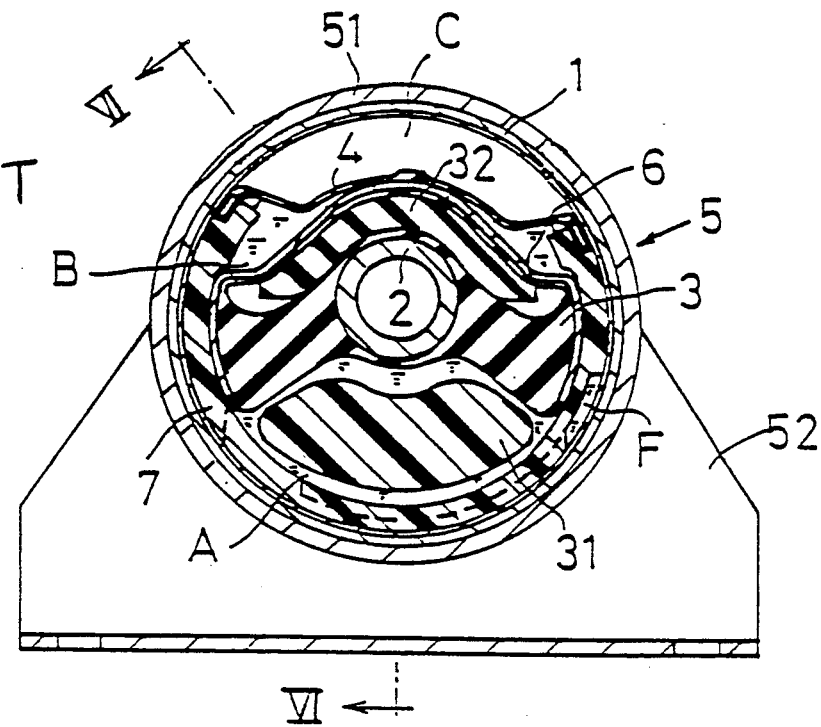
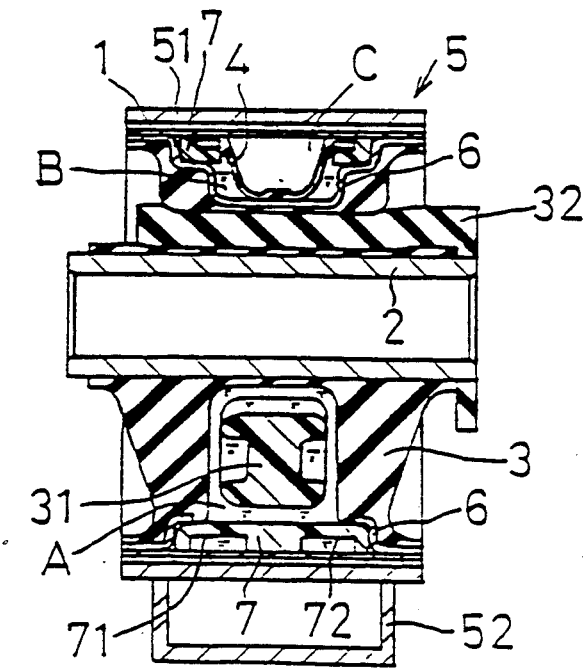

VIBRATION-DAMPING DEVICE WITH HYDRAULIC DAMPING

BACKGROUND OF THE INVENTION

1. Field of the Invention

The present invention relates to a vibration-damping device and, more particularly, to an improvement in the structure of a cylindrical vibration-damping device wherein a vibration-damping rubber body having a liquid chamber is disposed between an outer cylinder and an inner cylinder.

2. Description of the Prior Art

FIGS. 5 and 6 illustrate one example of a conventional cylindrical vibration-damping device. In the drawings, a holder 5 secured to a frame of a vehicle has a cylindrical holder portion 51 and a leg portion 52 which supports the cylindrical holder portion 51. A thin-walled outer cylinder 1 is press-fitted into the cylindrical holder portion 51. A vibration-damping rubber body 3 is disposed within the outer cylinder 1.

An internal ring 6 is secured to the outer surface of the vibration-damping rubber body 3 in sealing engagement with the outer cylinder 1. The vibration-damping rubber body 3 defines a space in its lower half portion, which space serves as a main liquid chamber A. A resin block 31 having a size slightly smaller than that of the main liquid chamber A and having a configuration similar thereto is disposed within the main liquid chamber A. An inner cylinder 2 is embedded within the vibration-damping rubber body 3 so as to axially penetrate it. A buffer rubber plate 32 is disposed within another space formed in the upper portion of the vibration-damping rubber body 3 under the internal ring 6 and over the inner cylinder 2. One end of the buffer rubber plate 32 is secured to a facing end of the inner cylinder 2.

The axially central portion of the internal ring 6 caves inwardly. This caved portion opens at a position facing the main liquid chamber A. A ring-shaped throttling member 7 is disposed between the caved portion of the internal ring 6 and the outer cylinder 1. This throttling member 7 opens at its upper portion, and a thin rubber wall 4 is disposed with its peripheral edge fitted between an opening edge of the throttling member 7 and the inner surface of the outer cylinder 1, thereby defining a space between the thin rubber wall 4 and the outer cylinder 1.

The throttling member 7 has parallel channels 71, 72, each facing the outer cylinder 1. One end of the channel 71 communicates with the main liquid chamber A while the other end thereof communicates with the other channel 72. The channel 72 extending in parallel with the channel 71, turns at the point where the parallel channels 71, 72 communicate with each other, and extends to the auxiliary liquid chamber B formed between the rubber wall 4 and the internal ring 6. These parallel channels 71, 72 compose a throttled passageway F.

A bolt connected to an engine is inserted into the inner cylinder 2. When vibrations of the engine are input, the inner cylinder 2 relatively moves with respect to the outer cylinder 1, thereby deforming the shape of the main liquid chamber A. This results in a damping liquid enclosed in the main liquid chamber A flowing into the auxiliary liquid chamber B through the throttled passageway F with a high resistance, and accordingly effective vibration-damping operation being performed.

When vibrations of a too high frequency are input, the inner cylinder 2 abuts on the resin block 31 or the buffer rubber plate 32, thereby preventing the vibration-damping rubber body 3 from excessively deforming.

In order to make a sufficient amount of the enclosed damping liquid flow from the main liquid chamber A to the auxiliary liquid chamber B through the throttled passageway F, the rubber wall 4 defining the auxiliary liquid chamber B is required to freely deform, and the space C is required to have such a sufficient volume as to allow the free deformation of the rubber wall 4.

However, if the volume of the space C is increased in the device of the above-described prior art, there occurs a problem that the overall size of the device becomes too large.

In order to solve this problem, another device as shown in FIGS. 7 and 8 has been proposed. In this device, through holes 55 of a diameter larger than that of the through holes 11 formed in the outer cylinder 1 are provided in the holder portion 51 of the holder 5 so as to communicate with the through holes 11.

In accordance with this device, the thin rubber wall 4 can freely deform because the space C communicates with the atmosphere by way of the through holes 11, 55. However, in order to bring the through holes 1, 55 in communication with each other, precise adjustment of the rotating posture of the outer cylinder 1 with respect to the holder portion 51 is needed. This precise adjustment takes much time and labor.

When the through holes 55 are provided at the upper portion of the holder portion 51, as shown in FIGS. 7, 8, water is likely to stay therewithin, whereby the through holes 55 tend to rust. In order to prevent this problem, covers or like means must be provided in the holder 5.

SUMMARY OF THE INVENTION

It is an object of the present invention to provide a vibration-damping device by which a space volume sufficient for a free deformation of a rubber wall defining an auxiliary liquid chamber can be ensured without increase of the overall size of the device, and which does not require any troublesome adjustment of the relative position of an outer cylinder and a holder.

It is another object of the present invention to provide a vibration-damping device by which water is prevented from intruding into the device without using any additional cover means.

The vibration-damping device in accordance with the present invention has a base body, a cylindrical holder secured to the base body, an outer cylinder press-fitted within the cylindrical holder, and an inner cylinder disposed within the outer cylinder so as to axially penetrate the outer cylinder. A vibration-damping rubber body is disposed within the outer cylinder and provided with a main liquid chamber enclosing a damping liquid. The vibration-damping rubber body retains the inner cylinder. A thin rubber wall is disposed between the vibration-damping rubber body and the outer cylinder, thereby defining an auxiliary liquid chamber with the vibration-damping rubber body. The auxiliary liquid chamber communicates with the main liquid chamber by way of a throttled passageway. An inner surface of the cylindrical holder defines a groove extending along the entire circumference thereof. The outer cylinder has a through hole at such a position as to communicate with both the groove defined by the inner surface of the cylindrical holder, and a space defined by the thin rubber wall and the outer cylinder.

In the assembled state of the outer cylinder into the cylindrical holder, the space defined by the thin rubber wall and the outer cylinder communicates with the groove defined by the inner surface of the cylindrical holder by way of the through hole of the outer cylinder. This groove has a relatively large volume because it is formed over the entire inner circumference of the cylindrical holder. By virtue of this groove, the substantial volume of the above-described space is sufficiently increased. This results in the pressure buildup of this space being relatively small if the thin rubber wall deforms to a large scale, and accordingly free deformation of the thin rubber wall being allowed.

In accordance with the present invention, the overall size of the device is not substantially increased because a sufficient volume of the space defined by the thin rubber wall and the outer cylinder is ensured by virtue of the groove formed along the inner circumference of the cylindrical holder.

This groove is formed along the entire inner circumference of the holder, and accordingly, the through hole of the outer cylinder can be easily brought into communication with the groove of the holder. Therefore, severe position adjustment of the outer cylinder with respect to the holder is not required.

Furthermore, by forming a through hole in the cylindrical holder so as to communicate with the above-described groove of the cylindrical holder, the substantial volume of the space defind by the thin rubber wall and the outer cylinder can be further increased.

In particular, by providing the through hole at the lowermost position of the cylindrical holder, water can be prevented from intruding into this through hole, and accordingly, no cover nor like means is required.

BRIEF DESCRIPTION OF THE DRAWING

Other objects, features and characteristics of the present invention will become apparent upon consideration of the following description and the appended claims with reference to the accompanying drawings, all of which form a part of this specification.

FIG. 5 is a cross-sectional view of one conventional vibration-damping device;

FIG. 6 is a longitudinal sectional view taken along the line VI—VI of FIG. 5;

DETAILED DESCRIPTION OF THE PRESENTLY PREFERRED EXEMPLARY EMBODIMENTS

Figure 1:
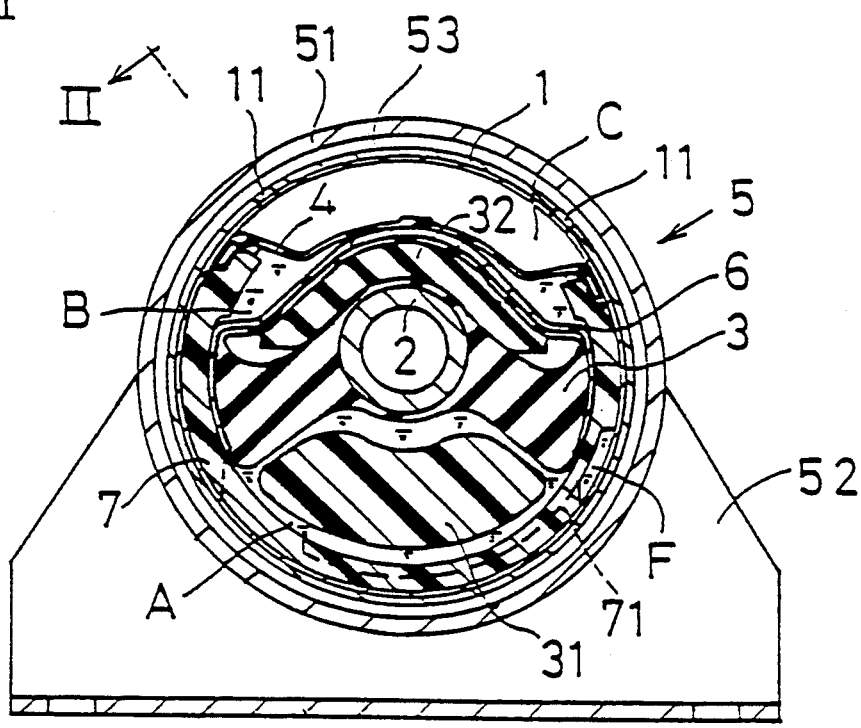
FIG. 1 is a cross-sectional view of a first embodiment of a vibration-damping device in accordance with the present invention.
Figure 2:
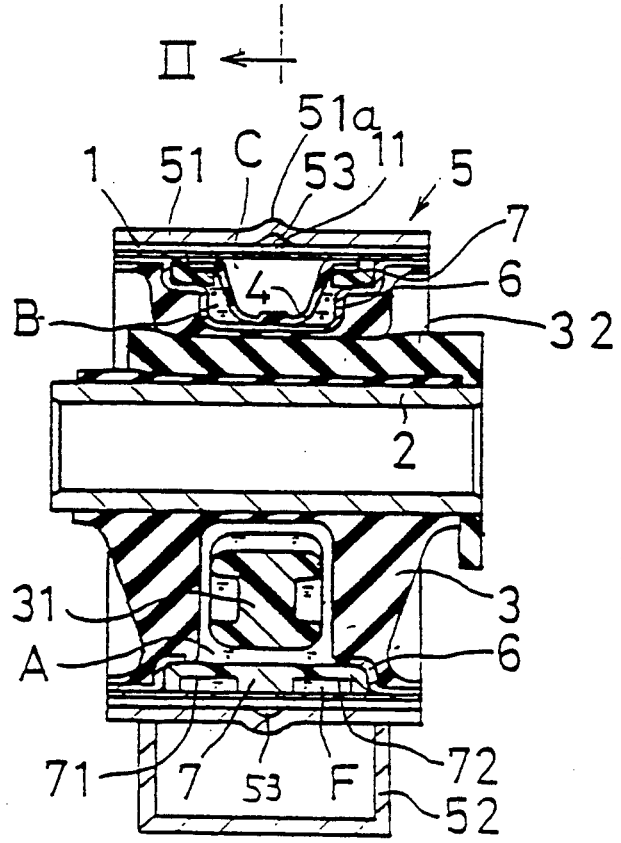
FIG. 2 is a longitudinal sectional view taken along the line II—II of FIG. 1.

Regarding to FIGS. 1 and 2, which illustrate a first embodiment of the present invention, an outer cylinder 1 is press-fitted into a cylindrical holder portion 51 of a holder 5. An internal ring 6 is closely fit into the outer cylinder 1. A vibration-damping rubber body 3 which defines a main liquid chamber A in its lower half portion is disposed in contact with the inner surface of the internal ring 6. An inner cylinder 2 is embedded in a central portion of the vibration-damping rubber body 3 so as to axially penetrate it. A throttling member 7 is disposed between the outer cylinder 1 and a recess portion of the internal ring 6 which is formed in its axially central portion. An auxiliary liquid chamber B is defined by a thin-walled rubber wall 4 attached along an upper opening edge of the throttling member 7, and the upper outer surface of the internal ring 6. The auxiliary liquid chamber B communicates with the main liquid chamber A by way of a throttled passageway F formed in the throttling member 7. The thin-walled rubber wall 4 defines a space C with the inner surface of the outer cylinder 1.

An axially central portion of the holder portion 51 projects outwardly over the entire circumference thereof to form a rib 51a. This rib 51a defines a groove 53 in its inner surface. Through holes 11 are provided in the outer cylinder 1 at positions symmetrical with each other so as to communicate with the groove 53.

Reference numeral 31 designates a resin block provided in the main liquid chamber A, 32 designates a buffer rubber plate provided within the vibration-damping body 3 over the inner cylinder 2 and under the internal ring 6, 52 designates a leg portion which supports the holder portion 51, and 71, 72 designate parallel channels formed in the throttling member 7.

In the device having the above-described structure, the substantial volume of the space C can be increased because the space C communicates with the groove 53 by way of the through holes 11.

When a damping liquid flows into the auxiliary fluid chamber B from the main fluid chamber A, the thin-walled rubber wall 4 upwardly expands, thereby decreasing the volume of the space C. However, by virtue of the groove 53, there does not occur a remarkable pressure buildup in the space C. Accordingly, the rubber wall 4 is allowed to freely deform upwardly, whereby a sufficient amount of damping liquid flows into the auxiliary chamber by way of the throttled passageway F, and effective vibration-damping operation is performed.

Furthermore, the vibration-damping device of the present embodiment is not required to be of a large scale because the substantial volume of the space C is relatively large due to the provision of the groove 53 formed along the entire inner circumference of the cylindrical holder portion 51.

In the vibration-damping device of the first embodiment, the through holes 11 always communicate with the groove 53 in any rotating posture of the outer cylinder 1 with respect to the holder portion 51 because the groove 53 is formed over the entire circumference of the holder portion 51. Therefore, troublesome position adjustment of the outer cylinder 1 with respect to the holder portion 51 is not needed, and the outer cylinder 1 can freely take any rotating posture in accordance with the direction in which the vibrations are applied.

In accordance with the vibration-damping device of the first embodiment, the outer cylinder 1 can be speedily and easily press-fitted in the cylindrical holder 5 without any severe position adjustment.

Figure 3:
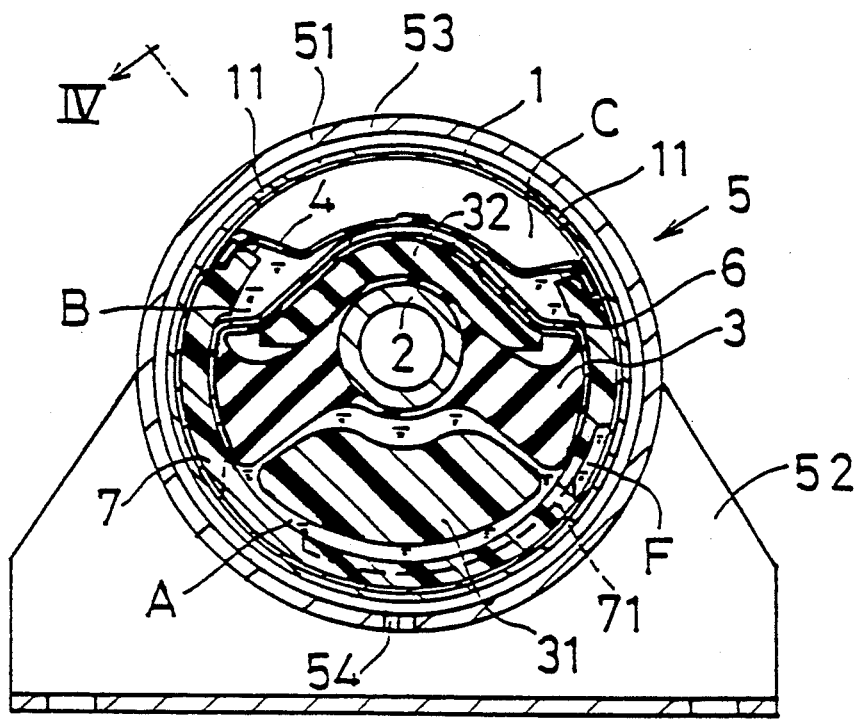
FIG. 3 is a cross-sectional view of a second embodiment of a vibration-damping device in accordance with the present invention.
Figure 4:
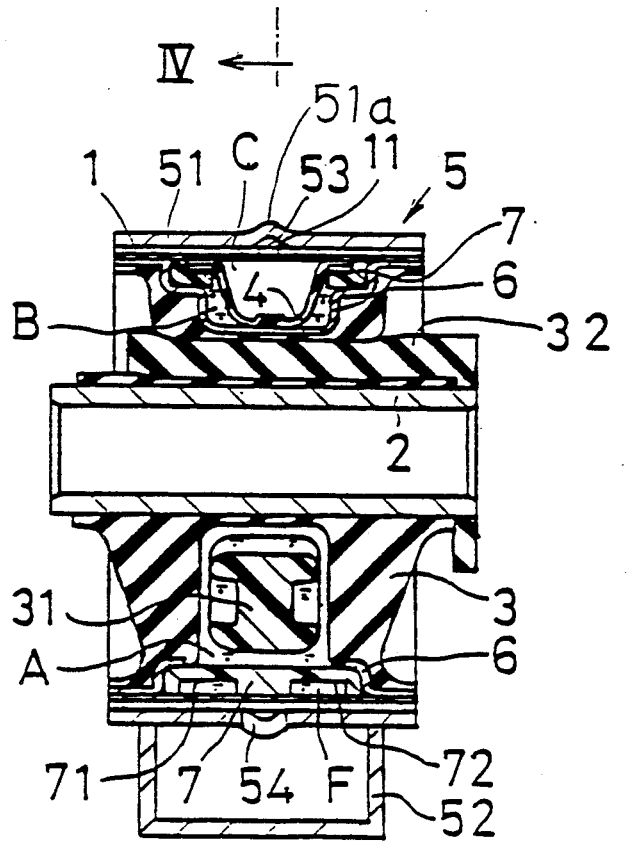
FIG. 4 is a longitudinal sectional view taken along the line IV—IV of FIG. 3.
Figure 7:
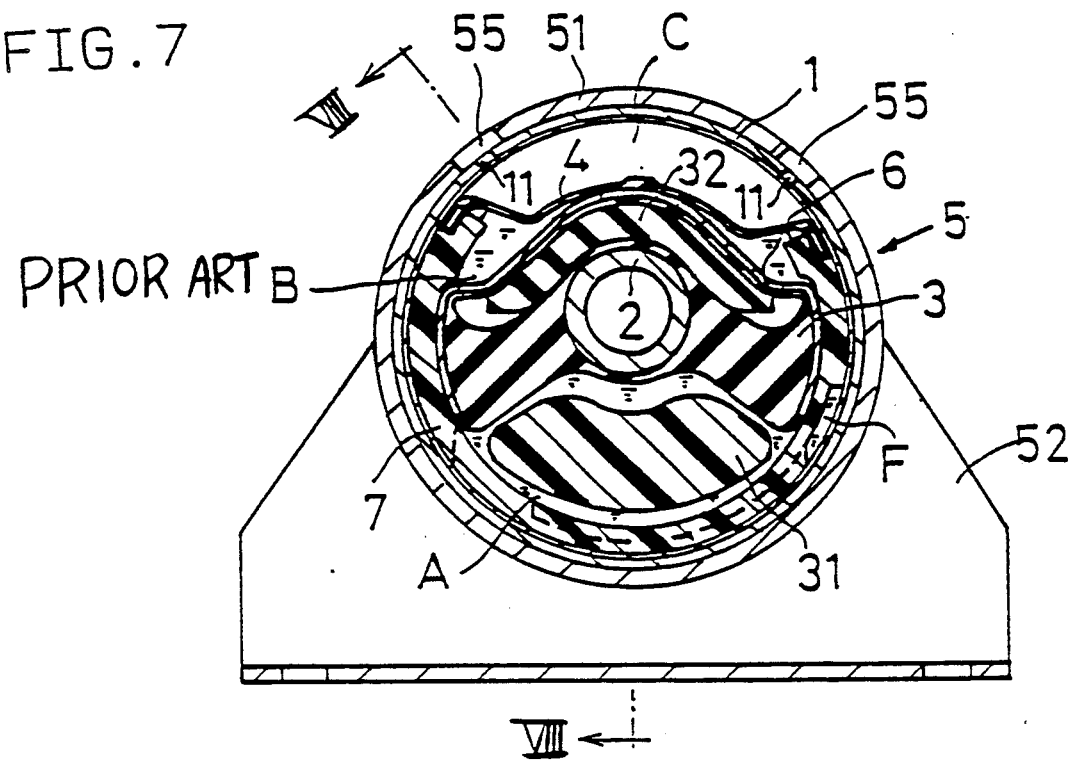
FIG. 7 is a cross-sectional view of another conventional vibration-damping device.
Figure 8:
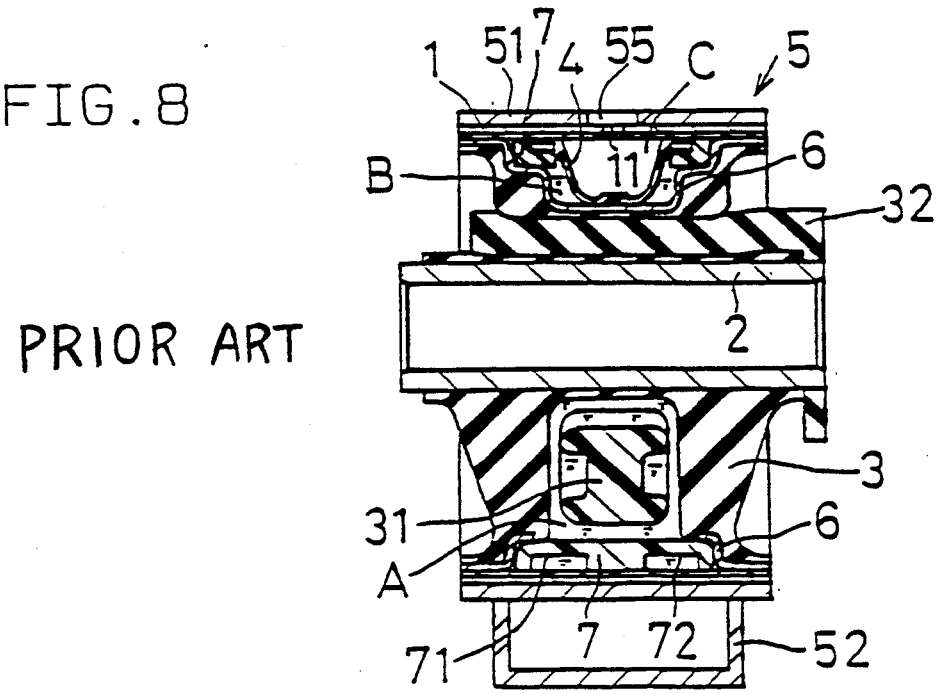
FIG. 8 is a longitudinal sectional view taken along the line VIII—VIII of FIG. 7.

Regarding to FIGS. 3 and 4 which illustrate a second embodiment of the present invention, a through hole 54 is formed at a lowermost position of the rib 51a of the holder portion 51. This through hole 54 puts the groove 53 into communication with the atmosphere. Thus, the space C defined by the thin-walled rubber wall 4 and the inner surface of the outer cylinder 1 communicates with the atmosphere by way of the through holes 11, groove 53 and through hole 54.

The remainder of the structure of the second embodiment is substantially the same as that of the first embodiment.

In the second embodiment, the through hole 54 is formed at the same time that the cylindrical holder portion 51 is formed. Therefore, additional punching work for the through hole 54 is unnecessary.

In accordance with the second embodiment, the substantial volume of the space C can be further increased as compared with the first embodiment by virtue of the through hole 54.

The through hole 54 may be provided at any position of the rib 51a regardless of the position of the space C. In particular, by providing the through hole 54 at the lower portion of the rib 51a, as described above, water can be prevented from intruding into the through hole 54 and staying there. Accordingly, any cover or like means is unnecessary for the through hole 54.

What is claimed is:

1. A vibration-damping device with hydraulic damping comprising:
   a base body;
   a cylindrical holder secured to said base body, said cylindrical holder having a groove which extends along an inner surface of said cylindrical holder in a circumferential direction thereof;
   an outer cylinder press-fitted within said cylindrical holder;
   an inner cylinder disposed within said outer cylinder so as to axially penetrate said outer cylinder;
   a vibration-damping rubber body disposed within said outer cylinder and provided with a main liquid chamber enclosing a damping liquid, said vibration-damping rubber body retaining said inner cylinder;
   a thin rubber wall disposed between said vibration-damping rubber body and said outer cylinder, said thin rubber wall defining an auxiliary liquid chamber with said vibration-damping rubber body; and
   a throttled passageway for putting said auxiliary liquid chamber into communication with said main liquid chamber,
   said outer cylinder having a through hole at such a position as to communicate with both said groove and a space defined by said thin rubber wall and said outer cylinder, whereby said space communicate with said groove by way of said through hole of said outer cylinder.

2. The vibration-damping device according to claim 1, wherein said vibration-damping rubber body is secured to an inner surface of an internal ring having an inwardly caved portion which extends along an axially central portion of said internal ring in a circumferential direction thereof, said internal ring is press-fitted within said outer cylinder, a throttling member defining said throttled passageway is disposed between said inwardly caved portion of said internal ring and said outer cylinder, and said thin rubber wall is secured to an opening edge of said throttling member, whereby said vibration-damping rubber body is disposed within said outer cylinder, and said auxiliary liquid chamber is defined by said thin rubber wall and said caved portion of said internal ring.

3. The vibration-damping device according to claim 1, wherein said cylindrical holder has a rib-like projection which radially outwardly project from an axially central portion of said cylindrical holder over the entire circumference thereof, and an inner surface of said rib-like projection defines said groove.

4. The vibration-damping device according to claim 1, wherein said cylindrical holder has a through hole at such a position as to communicate with said groove, whereby said groove communicates with the atmosphere by way of said through hole of said cylindrical holder.

5. The vibration-damping device according to claim 4, wherein said through hole of said cylindrical holder is provided at a lowermost position of said cylindrical holder.

* * * * *